United States Patent [19]

Wilson et al.

[11] Patent Number: 4,678,625
[45] Date of Patent: Jul. 7, 1987

[54] METHOD OF STRAIGHTENING BOWED IRRADIATED FUEL ASSEMBLIES

[75] Inventors: John F. Wilson, Murrysville Boro; Robert K. Gjertsen, Monroeville, both of Pa.

[73] Assignee: Westinghouse Electric Corp., Pittsburgh, Pa.

[21] Appl. No.: 762,745

[22] Filed: Aug. 5, 1985

[51] Int. Cl.$^4$ .................. G21C 19/00; G21C 3/32
[52] U.S. Cl. .................. 376/261; 376/260; 376/353; 376/434; 376/445; 376/449; 29/282; 29/283.5; 29/400 N; 72/370
[58] Field of Search .............. 376/260, 261, 445, 353, 376/446, 449, 434, 463, 285; 29/400 N, 723, 283.5, 282, 447; 72/58, 59, 370

[56] References Cited

U.S. PATENT DOCUMENTS

| | | | |
|---|---|---|---|
| 3,150,053 | 9/1964 | Goldman et al. | 376/445 |
| 3,646,799 | 3/1972 | Kipp et al. | 72/370 |
| 3,733,252 | 5/1973 | Georges et al. | 376/445 |
| 4,075,058 | 2/1978 | Noyes | 376/445 |
| 4,097,331 | 6/1978 | Betten | 376/445 |
| 4,119,490 | 10/1978 | Delafosse | 376/449 |
| 4,284,475 | 8/1981 | Anthony | 376/353 |
| 4,314,884 | 2/1982 | Fanning et al. | 376/444 |
| 4,326,921 | 4/1982 | Cadwell | 376/353 |
| 4,535,523 | 8/1985 | Leclereq | 376/446 |
| 4,548,657 | 10/1985 | Eddens | 376/353 |

Primary Examiner—Deborah L. Kyle
Assistant Examiner—Dan Wasil

[57] ABSTRACT

A method of straightening an irradiated fuel assembly having a plurality of control rod guide thimbles in which some of the guide thimbles are bowed and thus greater in length than other of the guide thimbles comprises the steps of determining the length adjustments required for shortening the respective bowed guide thimbles in order to make their respective lengths generally the same as the other guide thimbles, and then forming expansions in the bowed guide thimbles so as to shorten their respective lengths by the amounts of the length adjustments. Usually, a plurality of expansions are made in most of the bowed guide thimbles at spaced locations between opposite ends thereof. Some of the expansions differ in the amount of shortening from other of the expansions. Also, the total amount of shortening of the bowed guide thimbles is controlled by the number of the expansions and the amount of shortening which results from each expansion. Thus, a straightened skeletal structural of a fuel assembly comprises a plurality of guide thimbles each having opposite ends and top and bottom end nozzles connected to the opposite ends of the guide thimbles. Some of guide thimbles have at least one expansion formed thereon between their opposite ends so as to shorten them relative to other of guide thimbles having no corresponding expansion formed thereon and thereby make the respective lengths of the guide thimbles generally the same.

11 Claims, 8 Drawing Figures

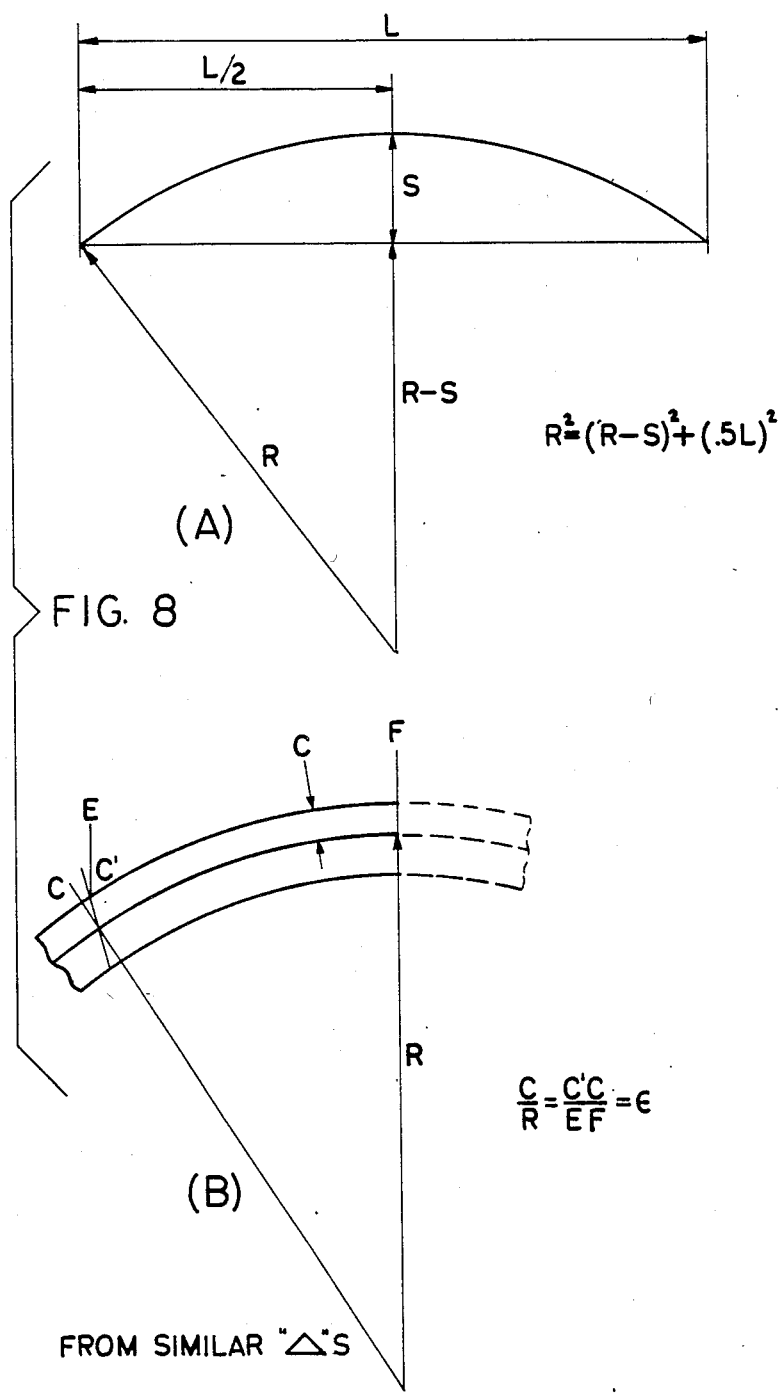

METHOD OF STRAIGHTENING BOWED IRRADIATED FUEL ASSEMBLIES

BACKGROUND OF THE INVENTION

1. Field of the Invention

The present invention relates generally to fuel assemblies for nuclear reactors and, more particularly, is concerned with a method of straightening an irradiated fuel assembly which has become bowed, the straightening being accomplished by adjusting the length of selected guide thimbles of the fuel assembly.

2. Description of the Prior Art

In most nuclear reactors, the reactor core is comprised of a large number elongated fuel assemblies. Conventional designs of these fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the guide thimbles which extend above and below the opposite ends of the fuel rods.

For many years, bowing has been observed to occur in pressurized water nuclear reactor (PWR) fuel assemblies. As fuel assembly length and hold-down spring forces have gradually increased over the past years, the magnitude of fuel assembly bow has become more severe. A number of causes of fuel assembly bow have been identified; however, there is no practical design change to the fuel assembly which will eliminate its occurrence.

Fuel assembly bow impacts two areas of fuel assembly performance. First, bow in a fuel assembly makes it difficult to remove and replace it in the core without damage to adjacent fuel assemblies. Damage usually occurs to grids on the affected fuel assemblies. The second area concerns the nuclear performance of bowed assemblies. Nuclear calculations are based on a predetermined inter-assembly water gap. If the adjacent assemblies are bowed, a larger than anticipated water gap can exist around the outside fuel rods. This larger water gap results in a higher thermal neutron flux on the outer fuel rods than would be the case if the gap existing between the fuel assemblies was uniform. This leads to reduced thermal margins for the fuel rod cladding and can result in significant plant operational penalties.

For the above reasons, it is highly desirable to minimize fuel assembly bow. Consequently, a need exists for a fresh approach to correcting fuel assembly bow, which as presently understood is inevitable, in order to avoid its long-term deleterious effects on PWR fuel assembly performance.

SUMMARY OF THE INVENTION

The present invention provides a method of straightening bowed irradiated fuel assemblies designed to satisfy the aforementioned needs. By realizing that fuel assembly bow cannot be effectively controlled by fuel assembly design, the approach of the present invention is to undertake straightening of severely bowed fuel assemblies at refueling. This will assure that severely bowed fuel assemblies are not reinserted in the core. In such manner, mechanical interface problems during core loading will be minimized and large inter-assembly water gaps during reactor operation will be substantially avoided.

Underlying the present invention is the basic concept that the fuel assembly skeleton, composed of an array of longitudinally-extending control rod guide thimbles connected at their opposite ends to top and bottom nozzles, can be straightened by adjusting, where necessary, the lengths of the individual guide thimbles which are the main contributor to the lateral stiffness of the fuel assembly skeleton. If a fuel assembly is bowed, then at least some of its main structural members, the guide thimbles, must also be bowed.

It would seem that one way to make all guide thimbles of a bowed assembly the same length again is to bend the skeleton in such a way that the thimbles on the concave side of the bow are stretched and those on the convex side of the bow are compressed. This is generally the same way a bent beam is straightened. The problem with this method, when applied to a fuel assembly, is that the thimbles must be stressed over their entire length to a stress level in excess of the elastic limit of the thimble material, otherwise there will be no permanent set (straightening) of the skeletal structure. Another possible way of straightening the bowed fuel assembly would seem to be to stretch it. This method is also used to straighten small beams. Again, the problem is the guide thimbles must be stressed beyond the elastic limit over their full lengths. To apply this level of force to the fuel assembly would very highly load the guide thimble-to-nozzle connections. Thus, the problem faced in straightening a bowed fuel assembly is to somehow make all the guide thimbles the same length again without damaging the fuel assembly.

The present invention solves this problem by shortening those of the guide thimbles which are too long through placing small expansions (bulges) in them. Each small expansion reduces the length of the selected guide thimble by a certain small amount. Thus, the lengths of the bowed guide thimbles can be changed by small amounts wihtout loading their entire longitudinal extents and without affecting the shorter straight guide thimbles.

Accordingly, the present invention is directed to a method of straightening a fuel assembly having at least a pair of tubular structural members in which at least one member is bowed and thus greater in length than the other of the members so as to cause the fuel assembly to have a bowed configuration. The straightening method comprises the steps of: (a) determining the length adjustment required for shortening the bowed tubular structural member in order to make its length generally the same as the other member; and (b) forming at least one expansion in the bowed member so as to shorten its length by the amount of the length adjustment. More particularly, a plurality of expansions are made in the bowed member at spaced locations between opposite ends thereof. Furthermore, some of the expansions can differ in the amount of shortening from other of the expansions. The total amount of shortening of the bowed member is controlled by the number of the expansions and the amount of shortening which results from each expansion.

More specifically, the fuel assembly includes a plurality of control rod guide thimbles in which some of the guide thimbles are bowed and thus greater in length than other of the guide thimbles which are generally straight. In such instance, the length adjustments required for shortening respective bowed guide thimbles in order to make their respective lengths generally the same as the other guide thimbles are first determined and then expansions in the bowed guide thimbles are formed so as to shorten their respective lengths by the amounts of length adjustments.

The present invention is also directed to a method of shortening a fuel assembly including a plurality of control rod guide thimbles in which some of the guide thimbles are greater in length than others, wherein the shortening method comprises the steps of: (a) determining the length adjustments required for shortening the respective longer guide thimbles in order to make their respective lengths generally the same as the other guide thimbles; and (b) forming expansions in such longer guide thimbles so as to shorten their respective lengths by the amounts of the length adjustments.

Additionally, the present invention relates to a straightened skeletal structural of a fuel assembly, comprising: (a) a plurality of elongated tubular structural members, each member having opposite ends; and (b) top and bottom end structures connected to the opposite ends of the tubular structural member. Some of the structural members have at least one expansion formed thereon between their opposite ends so as to shorten them relative to other of the members which have no corresponding expansion formed thereon and thereby make the respective lengths of the members generally the same.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 8 depicts the geometrical relationships involved in calculation of the length adjustment to be made to the bowed guide thimbles of a bowed fuel assembly.

DETAILED DESCRIPTION OF THE INVENTION

Figure 1:
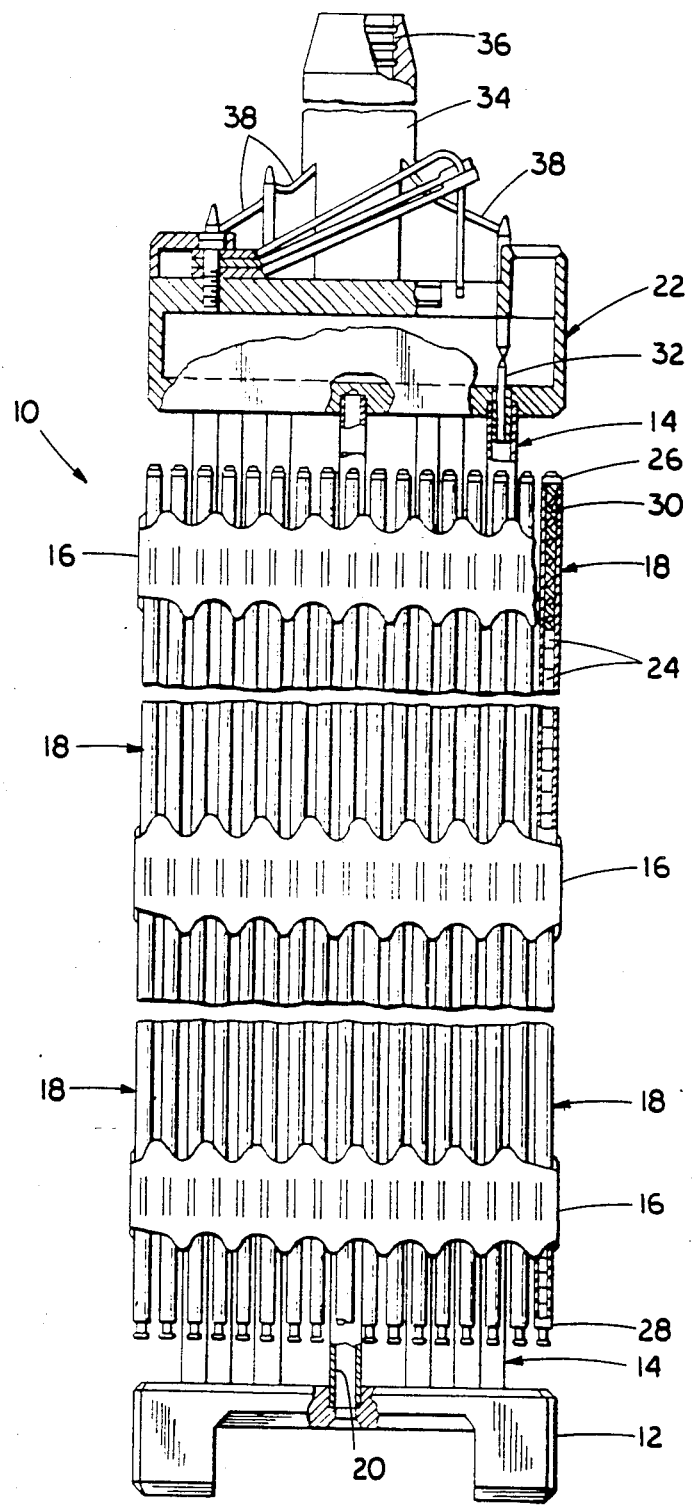
FIG. 1 is an elevational view, foreshortened and partly in section, of a nuclear fuel assembly susceptible to becoming bowed during service in a nuclear reactor core and amendable to being straightened in accordance with the principles of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not be construed as limiting terms.

IN GENERAL

Referring now to the drawings, and particularly to FIG. 1, there is shown an elevational view of a PWR fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and is closed at its opposite ends by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator-coolant such as water, or water containing boron, is pumped upwardly through the guide thimbles 14 and along the fuel rods 18 of the fuel assembly 10 in order to extract heat generated therein for the production of useful work.

To control the fission process, a number of control rods 32 are reciprocally movable in the guide thimbles 14 located at predetermined positions in the fuel assembly 10. Specifically, a rod cluster control mechanism 34 associated with the top nozzle 22 has an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

BOWED IRRADIATED FUEL ASSEMBLY STRAIGHTENING METHOD

Figure 2:
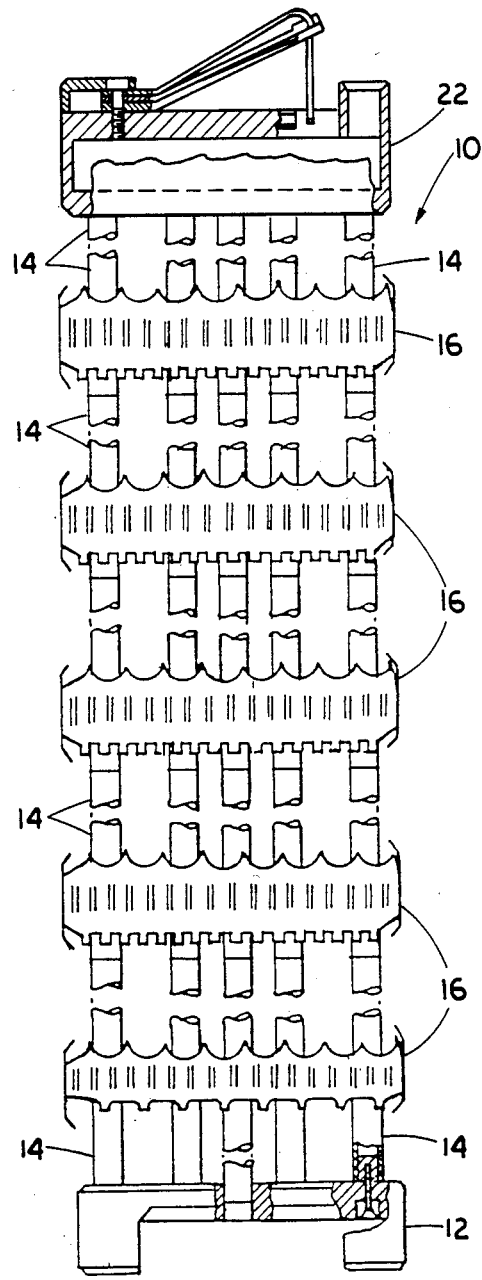
FIG. 2 is an elevational view, on a smaller scale, of the skeletal structure of the fuel assembly of FIG. 1, being composed of an array of guide thimbles which support axially spaced grids and are connected at upper and lower ends to top and bottom nozzles of the assembly.

Turning now to FIG. 2, there is seen the skeletal structure of the fuel assembly 10, being composed of the array of guide thimbles 14 connected at their lower ends to the bottom nozzle 12 and at their upper ends to the top nozzle 22. The lateral spacing of the thimbles 14 is maintained by the transverse grids 16 located in axially spaced positions along the thimbles. Typically, the grids 16 are mechanically attached to the thimbles 14 by expansion joints. The fuel rods 18, not seen in FIG. 2, are held in a parallel array by the individual cells defined in the grids 16. The attachment between one grid cell and one fuel rod is by frictional forces generated by a conventional spring and dimple arrangement (not shown). Therefore, the fuel rods can move in an axial direction relative to the grid if sufficient force exists to overcome the frictional forces. Consequently, it is apparent that the main contributor to fuel assembly lateral stiffness is the guide thimbles 14 of the skeletal structure. (The fuel rods provide some lateral stiffness due to their connection to the grids via the friction type connection.)

Figure 3:
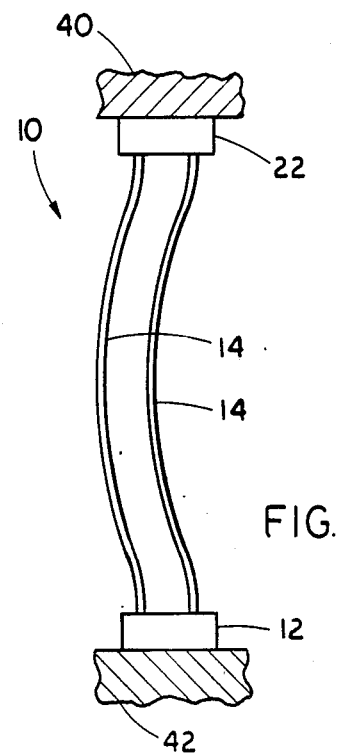
FIG. 3 is a schematical view of a bowed fuel assembly located in a nuclear reactor core.
Figure 4:
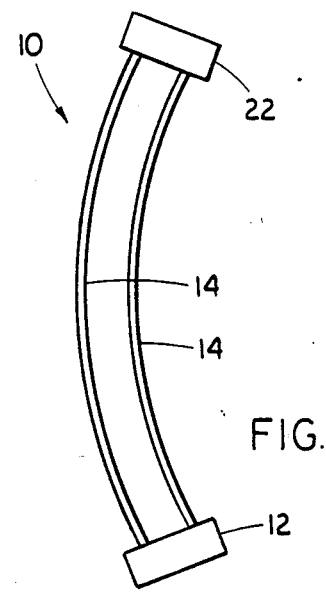
FIG. 4 is a schematical view of the bowed fuel assembly of FIG. 3 being removed from the reactor core.

As schematically depicted in FIGS. 3 and 4 in a simplified form, the guide thimbles 14 of the skeletal structure must be bowed, some more and others less, if the fuel assembly 10 is bowed. In FIG. 3, the fuel assembly 10 is illustrated extending in a bowed configuration between the upper and lower support plates 40,42 of the reactor core, whereas the bowed fuel assembly is depicted in FIG. 4 removed from the core, such as at refueling when the opportunity is presented for straightening the fuel assembly before reinserting it back into the core.

The fundamental problem in straightening the bowed fuel assembly 10 is to somehow make all of the guide thimbles 14 the same length again without damaging the fuel assembly. To give some idea of the amount the guide thimble lengths must be changed to straighten a bowed fuel assembly, the calculation of the length adjustment for an example of a bowed assembly is set forth hereafter with reference to the geometrical relationships graphically illustrated in FIG. 8. The example is of an eight inch square, twleve-foot long fuel assembly which has been determined to be bowed 0.4 inch out-of-straightness.

EXAMPLE

Given the relationship from FIG. 8(A):

$$R^2 = (R-S)^2 + (0.5L)^2$$

Then, $R^2 = (R-0.4)^2 + [0.5(144)]^2$ Where L=144 inches, and S=0.4 inch
Solving for R, R=6480 inches
Given the relationship from FIG. 8(B):

$$C/R = C'C/EF = \gamma,$$

strain, in/in
Then, $\gamma = 4/6480 = 0.000154$ in/in
Where C=4 inches
Given that the guide thimble is 144 inches long, the length change of the outside thimble is:

$$0.000154 \times 144 = 0.022 \text{ inch}$$

These calculations show that the outermost guide thimbles must be changed by approximately 0.022 inch over their 12-foot lengths.

The objective of the present invention is to make all guide thimbles 14 in a bowed fuel assembly the same length by shortening the thimbles which are the most severely bowed and thus are too long. A simple way to accomplish this to form a series of small outward expansions 43 (FIGS. 6 and 7) in the thimble (360 degree bulges).

Figure 5:
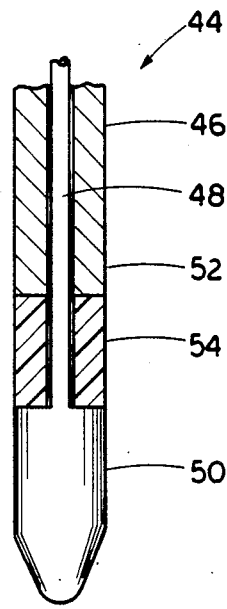
FIG. 5 is a fragmentary sectional view of a tool used to make the expansions or bulges in a guide thimble for reducing its length and thereby straightening it.

This type of forming is conventionally used to connect the guide thimbles to the grid sleeves. A tool, generally designated 44, which can be used to form the guide thimble expansions 43 is shown in FIG. 5. It includes an outer tube through which is reciprocally disposed a puller rod 48 having an enlarged plug 50 attached to its terminal end. Between the enlarged end plug 50 and the lower end 52 of the outer tube 46 is disposed a polyurethane sleeve 54 which surrounds the puller rod 48. Upon insertion of the tool 44 to the desired depth into a guide thimble 14, the rod 48 is retracted so as to compress the sleeve 54 between the enlarged end plug 50 and the outer tube lower end 52. The sleeve 54 then bulges radially outward and expands the adjacent portion of the guide thimble 14 which surrounds the bulging sleeve into the expansion 43.

Figure 6:
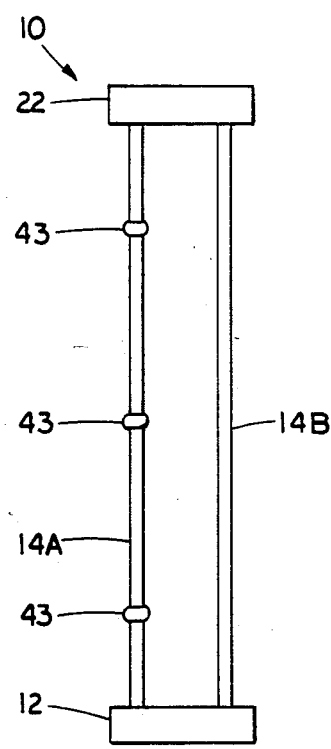
FIG. 6 is a simplified schematical view of one previously bowed guide thimble of a fuel assembly having been shortened to the length of an unbowed guide thimble of the assembly by introduction of several bulges therein at spaced locations along its longitudinal extent.

In one version of the straightened fuel assembly 10 which only has a pair of guide thimbles 14, such as seen in FIG. 6, the longer, previously bowed guide thimble 14A now contains three axially displaced expansions 43 which have shortened the thimble to generally the same length as the other thimble 14B which does not contain any corresponding expansions, the latter thimble being originally a generally straight one. In another version of the straightened fuel assembly 10 which includes a plurality of guide thimbles 14, such as seen in FIG. 7, four longer, previously bowed guide thimbles 14C to 14F now contain different numbers of axially displaced expansions 43 which have shorten the respective thimbles to generally the same length of the remaining unbowed thimble 14G.

The amount of thimble shortening per expansion 43 can be controlled by the amount of the outward expansion or bulge imparted on the thimble which is, in turn, controlled by the amount of force exerted on the tool puller rod 48. The total amount of shortening per thimble is controlled by the number of expansions per thimble and the amount of shortening per expansion. But before the expansions 43 are undertaken, the degree to which the fuel assembly is bowed and the length adjustments required to straighten it must be determined.

Therefore, in accordance with the method of the present invention, the basic step of determining the length adjustments required for shortening the respective bowed guide thimbles in order to make their respective lengths generally the same as the other guide thimbles must be carried out before the remaining step of forming expansions in the bowed guide thimbles so as to shorten their respective lengths by the amounts of the length adjustments can be accomplished. First, at refueling the fuel assembly 10 can be placed in a conventional fixture wherein its deviation from true axial alignment is measured. From the information generated concerning its deviation, a plot of the deformed shape of the assembly is obtained. Then, using the calculational techniques set forth previously with reference to the geometrical relationships illustrated in FIG. 8, the amount of length adjustment for each thimble is calculated. (This could also be done by a suitable process computer.) Also, the number, size and axial location of the expansions 43 can be calculated. A suitable fixture with bulge tools 44 can then be inserted into all of the guide thimbles 14 at the same time. This procedure can be similar to the one performed in building fuel assembly skeletons. The expansions 43 are then made and the assembly rechecked for straightness. As a general guideline, the size of expansions 43 will be limited to a value which will not result in thimble damage due to loss of ductility caused by irradiation damage to the Zircaloy material and the expansions should be made near the grid locations so they do not close down the flow channels at fuel rod midspan between the grids. By way of example, a single 360 degree bulge shortens the thimble by about 0.020 at maximum expansion. Small expansions give small values for shortening.

Figure 7:
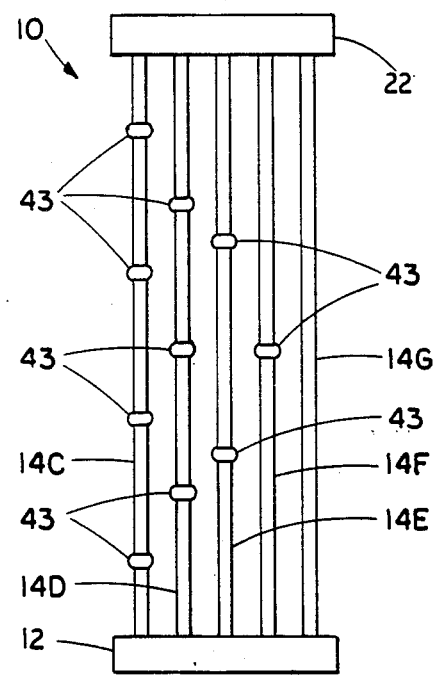
FIG. 7 is a schematical view of a straightened skeleton of a fuel assembly wherein the guide thimbles previously bowed in varying degrees have been straightened and thereby shortened in the length to that of the unbowed guide thimble of the assembly by the introduction of different numbers and sizes of bulges into the guide thimbles corresponding to amount of shortening required for a given thimble.

Thus, a straightened skeletal structure of a fuel assembly, such as depicted in FIG. 7, would comprise a plurality of guide thimbles 14C to 14C each having opposite ends and top and bottom end nozzles 22,12 connected thereto. Some of guide thimbles, such as thimble 14F, have at least one expansion 43 formed thereon while other thimbles 14C to 14E have more expansions 43 formed between their opposite ends so as to shorten them relative to other unbowed guide thimbles, such as thimble 14G, having no corresponding expansions formed thereon. In such manner, the respective lengths of the guide thimbles are made generally the same.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A method of straightening a fuel assembly having at least a pair of tubular structural members in which at least one member is bowed and thus greater in length than the other of said members so as to cause said fuel assembly to have a bowed configuration, said straightening method comprising the steps of:
   (a) determining the length adjustment required for shortening said bowed tubular structural member in order to make its length generally the same as said other member; and
   (b) forming at least one circumferential expansion bulge in said bowed member so as to shorten its length by the amount of said length adjustment.

2. The fuel assembly straightening method as recited in claim 1, wherein a plurality of circumferential expansion bulges are made in said bowed member at spaced locations between opposite ends thereof.

3. The fuel assembly straightening method as recited in claim 2, wherein some of said expansion bugles can differ in the amount of shortening from other of said expansions.

4. The fuel assembly straightening method as recited in claim 1, wherein the total amount of shortening of said bowed member is controlled by the number of said expansions and the amount of shortening which results from each expansion bulge.

5. A method of straightening a fuel assembly having top and bottom end structures, at least a pair of tubular structural members extending between and connected to said end structures and a plurality of fuel rod support grids mounted on and axially displaced along said tubular structural members, at least one tubular structural member being bowed and thus greater in length than the other of said members so as to cause said fuel assembly to have a bowed configuration, said straightening method comprising the steps of:
   (a) determining the length adjustment required for shortening said bowed tubular structural member in order to make its length generally the same as said other member; and
   (b) forming at least one circumferential expansion bulge in said bowed member so as to shorten its length by the amount of said length adjustment, said forming step being performed by making said expansion bulge adjacent the location of one of said support grids.

6. A method of straightening an irradiated fuel assembly having a bowed configuration, said fuel assembly including a plurality of control rod guide thimbles in which some of said guide thimbles are bowed and thus greater in length than other of said guide thimbles which are generally straight, said straightening method comprising the steps of:
   (a) determining the length adjustments required for shortening said respective bowed guide thimbles in order to make their respective lengths generally the same as said other guide thimbles; and
   (b) forming circumferential expansion bulges in said bowed guide thimbles so as to shorten their respective lengths by the amounts of said length adjustments.

7. The fuel assembly straightening method as recited in claim 6, wherein a plurality of circumferential expansion bulges are made in most of said bowed guide thimbles at spaced locations between opposite ends thereof.

8. The fuel assembly straightening method as recited in claim 7, wherein some of said expansion bulges differ in the amount of shortening from other of said expansion bulges.

9. The fuel assembly straightening method as recited in claim 6, wherein the total amount of shortening of said bowed guide thimbles is controlled by the number of said expansion bulges and the amount of shortening which results from each expansion bulge.

10. A method of shortening a fuel assembly including a plurality of control rod guide thimbles in which some of said guide thimbles are greater in length than other of said guide thimbles, said shortening method comprising the steps of:
    (a) determining the length adjustments required for shortening said respective some of said guide thimbles in order to make their respective lengths generally the same as said other guide thimbles; and
    (b) forming circumferential expansion bulges in said some guide thimbles so as to shorten their respective lengths by the amounts of said length adjustments.

11. A straightened skeletal structure of a nuclear fuel assembly, comprising:
    (a) a plurality of elongated tubular structural members, each member having opposite ends, and
    (b) top and bottom end structures connected to said opposite ends of said tubular structural members;
    (c) some of said structural members having at least one circumferential expansion bulge formed thereon in the area between said top and bottom end structures;
    (d) others of said structural members having no circumferential bulge in said area;
    (e) the number of said circumferential expansion bulges formed in each of said structural members being sufficient to shorten said some of said members relative to said others of said members having no corresponding circumferential expansion bulge formed thereon in said area for making the respective lengths of said some of said members and said others of said members generally the same.

* * * * *

UNITED STATES PATENT AND TRADEMARK OFFICE
CERTIFICATE OF CORRECTION

PATENT NO. : 4,678,625

DATED : July 7, 1987

INVENTOR(S) : John F. Wilson et al.

It is certified that error appears in the above-identified patent and that said Letters Patent is hereby corrected as shown below:

Cover sheet, Inventors:

Line 3, delete "both" and substitute

-- DONALD G. SHERWOOD, Monroeville, all --

Signed and Sealed this

Twenty-ninth Day of November, 1988

Attest:

DONALD J. QUIGG

*Attesting Officer*　　　　*Commissioner of Patents and Trademarks*